United States Patent Office 3,230,091
Patented Jan. 18, 1966

3,230,091
PRESSURIZED DESSERT TOPPINGS
Stuart W. Thompson, Allendale, N.J., assignor to Lever Brothers Company, New York, N.Y., a corporation of Maine
No Drawing. Filed Sept. 12, 1961, Ser. No. 137,528
3 Claims. (Cl. 99—139)

The present invention relates to a topping mix, and more particularly to a topping mix to be used in preparing whipped toppings.

The preparation of emulsions consisting primarily of hydrogenated vegetable fats in water which are whipped to a structure resembling that of whipped cream has long been commoplace. Such emulsions normally contain a small amount of protein material and an emulsifier which is a mixture of long chain fatty acid monoglycerides. They also usually contain sugar and often starch, gums or other stabilizing materials.

The proportion of monoglycerides and the composition of the fatty acids in the monoglycerides have a profound effect upon the fluidity of the emulsion, the rate at which it will pick up air in whipping, the specific volume to which it can be whipped and the appearance, texture, and mouth feel of the whipped product. For bakery use the fluidity of the emulsion is not important and the composition and level of the emulsifier are adjusted for optimum effects with regard to the other properties.

When the emulsions are used for aerosol dessert toppings they are whipped by the dissolved gaseous propellant as they are extruded. The emulsifier composition and level are selected so as to provide the optimum balance of physical properties for the whipped product, and retention of fluidity for the emulsion during shelf storage. Retention of good appearance, texture and mouth feel on storage are extremely emportant factors in these emulsions.

Emulsifiers consisting of monoglycerides of unsaturated fatty acids or of saturated fatty acids with 16 or less carbon atoms produce emulsions which are non-fluid or which soon lose their fluidity. On the other hand, emulsifiers consisting of monoglycerides of stearic acid or of stearic-palmitic acid mixtures produce emulsions which are fluid but if used as aerosol dessert toppings are too smooth, shiny, foamy, and marshmallowy when dispensed. Compromise effects have been attempted with mixtures of saturated and unsaturated fatty acid monoglycerides. It is not possible, however, to use a sufficiently high ratio of the unsaturated fatty acid monoglyceride to produce the best appearance, texture and eating quality in an aerosol topping while still retaining sufficient emulsion fluidity.

Accordingly, it is an object of the present invention to produce emulsions suitable for dispensing from pressurized containers which have the appearance and physical properties desirable in a dessert topping. Another object of the present invention is to produce aerosol dessert toppings which retain good appearance, texteure and mouth feel on storage. These and other objects of the present invention will become apparent as the description proceeds.

It has been found that the objects of the present invention can be attained by compositions comprising as an emulsifier a combination of monoglycerides of saturated fatty acids and a lactylated glycerol ester of palmitic or stearic acids, or mixture of these acids. The balance of the topping mix will generally comprise a base fat, a sweetening agent, an encapsulating protein, salt, stabilizer, flavor, coloring and water.

The emulsifier compositions of the present invention are generally employed for optimum results at about 0.25% to about 0.50% topping basis, or at concentrations of from about 1 to about 2% based upon fat content, although it is to be understood that higher and lower concentrations may be used in particular formulations without departing from the scope of the present invention. The distilled monoglycerides of fully hydrogenated lard fatty acids are a specific example of the monoglycerides useful in the present invention. The monoglycerides of saturated fatty acids may comprise from about 10% to about 40% of the emulsifier composition, the lactylated glycerol ester comprising the balance.

The fat in the product imparts the desired creamy mouth feel. Products having a high fat content do not exhibit the crusting-over effect on standing shown by toppings low in fat and high in sugar. Suitable edible fats have a capillary melting point in the range of about 35° C. to about 40° C. Examples of fats which can be used according to this invention include partially hydrogenated soybean oil having an iodine value of about 80, partially hydrogenated cottonseed oil, coconut oil, and blends thereof which have melting characteristics similar to the soybean oil. Other edible fats with similar melting properties are also satisfactory for use according to this invention.

The sweetening agent may be sugar, preferably sucrose. If desired, an artificial sweetener such as saccharine or sodium cyclamate may be used. An innocuous filler will usually be employed with the synthetic sweetening agents used.

Example 1

Aerosol toppings were prepared containing the following compositions as emulsifiers:

(1) 0.03% Myverol 18:00 (distilled monoglycerides of fully hydrogenated lard fatty acids) and 0.1% Myverol 18:85 (distilled monoglycerides of unhardened cottonseed oil fatty acids).

(2) 0.05% Myverol 18:00 and 0.30% Drewmulse 9169 (glyceryl lactopalmitate).

The balance of the formula in both cases was:

| | Percent |
|---|---|
| Hydrogenated cottonseed oil | 30.0 |
| Sugar | 10.5 |
| Soy protein | 0.5 |
| Salt | 0.2 |
| Sodium carboxy methyl cellulose | 0.1 |
| Imitation vanilla flavor | 0.09 |
| Color (1% solution FD&C red No. 4) | 0.06 |
| Water to | 100.00 |

After pasteurization and homogenization, both emulsions were canned in conventional aerosol topping cans, approximately 10 fluid ounces per 16 ounce capacity can, and pressured with approximately 7 grams of 15% $CO_2 = 85\%$ $N_2O$ gas mixture. The two emulsions retained fluidity about equally well; after two months' storage at 50° F. both were fluid but after three months at this temperature both were slightly stuck in the can, requiring 6–8 shakes to loosen. Throughout this storage period the glyceryl lactopalmitate containing emulsion was rated good in appearance, texture and mouth feel. The product containing only the monoglycerides as emulsifiers was rated initially as being rather marshmallowy and during storage as being too heavy and slow melting in the mouth. Furthermore, during two months' storage alternating weekly between −10° F. and 50° F. the glyceryl lactopalmitate containing sample gave a whip which was satisfactory in appearance, texture and mouth feel while at the end of two months storage under these same conditions the monoglyceride emulsion had broken down and emerged from the can in a foamy and curdy condition.

The foregoing example clearly sets forth the unobvious and unexpected properties resulting from the present invention.

What I claim is:

1. An edible composition confined under pressure in an aerosol dispensing container; comprising a base fat, a protein, a sweetening agent, and an emulsifier which consists essentially of fatty acid glycerides and lactylated glycerol esters; said composition being capable of being dispensed from the pressurized container to provide an aerosol whipped topping.

2. An edible composition confined under pressure in an aerosol dispensing container comprising a base fat with melting characteristics similar to partially hydrogenated soybean oil, a protein, a sweeting agent, and about 0.25 to 0.50 parts by weight of an emulsifier which consists essentially of about 10% to 40% fatty acid glycerides and 60% to 90% lactylated glycerol esters; said composition being capable of being dispensed from a pressurized container to provide an aerosol whipped topping.

3. An edible composition confined under pressure in an aerosol dispensing container comprising about 0.05 part of distilled monoglycerides of fully hydrogenated lard fatty acids, about 0.3 part of glyceryl lactopalmitate, about 30 parts of hydrogenated cottonseed oil, about 10.5 parts of sugar, about 0.5 part of soy protein, about 0.2 part of salt and about 0.1 part of sodium carboxymethylcellulose; said composition being capable of being dispensed from the pressurized container to provide an aerosol whipped topping.

References Cited by the Examiner
UNITED STATES PATENTS

| | | | |
|---|---|---|---|
| 2,509,414 | 5/1950 | Barsky | 99—118 |
| 2,849,323 | 8/1958 | Young | 99—189 |
| 2,914,410 | 11/1959 | Butler | 99—139 |
| 3,010,830 | 11/1961 | Berndt et al. | 99—139 X |
| 3,029,147 | 4/1962 | Radlove | 99—123 X |

A. LOUIS MONACELL, *Primary Examiner.*

BEATRICE H. STRIZAK, RAYMOND N. JONES,
*Examiners.*